United States Patent
Xu (10) Patent No.: US 12,273,873 B2
(45) Date of Patent: Apr. 8, 2025

(54) WIRELESS COMMUNICATION METHOD AND DEVICE

(71) Applicant: GUANGDONG OPPO MOBILE TELECOMMUNICATIONS CORP., LTD., Guangdong (CN)

(72) Inventor: Weijie Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 423 days.

(21) Appl. No.: 17/148,235

(22) Filed: Jan. 13, 2021

(65) Prior Publication Data

US 2021/0136797 A1    May 6, 2021

Related U.S. Application Data

(63) Continuation of application No. PCT/CN2019/098016, filed on Jul. 26, 2019.

(30) Foreign Application Priority Data

Jul. 27, 2018    (CN) .......................... 201810846833.8

(51) Int. Cl.
   *H04L 1/1812* (2023.01)
   *H04L 1/00* (2006.01)
   (Continued)

(52) U.S. Cl.
   CPC ....... *H04W 72/1268* (2013.01); *H04L 1/0003* (2013.01); *H04L 1/1819* (2013.01);
   (Continued)

(58) Field of Classification Search
   None
   See application file for complete search history.

(56) References Cited

U.S. PATENT DOCUMENTS

| 8,582,511 B2 | 11/2013 | Vujcic et al. | |
| 2010/0031111 A1* | 2/2010 | Cai | H04L 1/1896 714/751 |
| 2011/0119548 A1* | 5/2011 | Imamura | H04L 1/1887 714/748 |

(Continued)

FOREIGN PATENT DOCUMENTS

| CA | 3019611 A1 | 10/2017 |
| CN | 108076534 A | 5/2018 |

(Continued)

OTHER PUBLICATIONS

Examination Report for European Application No. 19841583.8 issued Oct. 20, 2022. 3 pages.

(Continued)

*Primary Examiner* — The Hy Nguyen
(74) *Attorney, Agent, or Firm* — PERKINS COIE LLP (57) ABSTRACT

Provided by the present disclosure are a wireless communication method and device. The method includes that a terminal device sends a first message to a network device, wherein the first message includes a preamble and uplink data, the terminal device receives scheduling information sent by the network device, the scheduling information being configured to indicate the terminal device to retransmit the uplink data, and on the basis of the scheduling information, the terminal device retransmits the uplink data.

12 Claims, 4 Drawing Sheets

(51) Int. Cl.
*H04L 1/1867* (2023.01)
*H04W 56/00* (2009.01)
*H04W 72/0446* (2023.01)
*H04W 72/0453* (2023.01)
*H04W 72/1268* (2023.01)
*H04W 72/21* (2023.01)
*H04W 72/50* (2023.01)
*H04W 76/27* (2018.01)

(52) U.S. Cl.
CPC ......... *H04L 1/189* (2013.01); *H04W 56/0045* (2013.01); *H04W 72/0446* (2013.01); *H04W 72/0453* (2013.01); *H04W 72/21* (2023.01); *H04W 72/535* (2023.01); *H04W 76/27* (2018.02)

(56) References Cited

U.S. PATENT DOCUMENTS

| | | | |
|---|---|---|---|
| 2017/0288817 A1* | 10/2017 | Cao | H04L 1/0079 |
| 2018/0198646 A1 | 7/2018 | Gau et al. | |
| 2018/0279375 A1* | 9/2018 | Jeon | H04W 74/0833 |
| 2019/0357266 A1 | 11/2019 | Ren et al. | |
| 2021/0153259 A1* | 5/2021 | Wu | H04L 1/1864 |
| 2021/0153263 A1* | 5/2021 | Wu | H04W 74/0833 |

FOREIGN PATENT DOCUMENTS

| | | |
|---|---|---|
| CN | 108282897 A | 7/2018 |
| CN | 108282899 A | 7/2018 |
| CN | 108282903 A | 7/2018 |
| WO | 2018085428 A1 | 5/2018 |
| WO | 2018127228 A1 | 7/2018 |
| WO | 2018127549 A1 | 7/2018 |

OTHER PUBLICATIONS

EPO, Extended European Search Report for European Application No. 19841583.8. Mail Date: Jul. 27, 2021. 9 pages.
ZTE Corporation, ZTE Microelectrics "On 2-step RACH procedure in NR" R1-1611274; 3GPP TSG RAN WG1 Meeting #87. 4 pages.
Examination Report for European Application No. 19841583.8 issued Mar. 29, 2022. 5 pages with English translation.
Examination Report for Indian Application No. 202117003661 issued Jan. 31, 2022. 5 pages with English translation.
International Search Report mailed Oct. 31, 2019 of PCT/CN2019/098016 (4 pages).
First Office Action for Chinese Application No. 202110344363.7 issued Jul. 19, 2022. 24 pages with English translation.
Examination report of the European application No. 19841583.8, issued on Apr. 28, 2023. 5 pages.
Examination report of the European application No. 19841583.8, issued on Nov. 7, 2023. 5 pages.
Result of consultation of the European application No. 19841583.8, issued on Oct. 31, 2023. 3 pages.
First Examiners call and proposed amendment of the European application No. 19841583.8, issued on Oct. 31, 2023. 2 pages.
Second Examiners call and proposed amendment of the European application No. 19841583.8, issued on Jan. 25, 2024. 4 pages.

* cited by examiner

WIRELESS COMMUNICATION METHOD AND DEVICE

CROSS-REFERENCE TO RELATED APPLICATION

This application is a continuation application of International Application No. PCT/CN2019/098016 filed on Jul. 26, 2019, which claims the priority of the Chinese Application No. 201810846833.8, entitled "Wireless Communication Method and Device", filed to the CNIPA on Jul. 27, 2018. The entire contents of above identified applications are hereby incorporated by reference.

TECHNICAL FIELD

The present disclosure relates to the field of communications, and more particularly, to a wireless communication method and a device.

BACKGROUND

Random access is the most basic function of a cellular system, which makes it possible for a terminal device to set up a communication connection with a network device. In a new radio (NR) system (or called a 5G system or 5G network), a four-step random access procedure similar to that of a long term evolution (LTE) is adopted, however, signaling overhead of the traditional four-step random access procedure is relatively large.

Therefore, to reduce signaling overhead, a two-step random access procedure is proposed, but how to transmit data based on the two-step random access procedure is an urgent problem to be solved.

SUMMARY

The present disclosure provides a wireless communication method and a device, which can reduce a delay of the two-step random access procedure.

In a first aspect, a wireless communication method is provided. The method includes: a terminal device sends a preamble and uplink data to a network device, the terminal device receives scheduling information sent by the network device, wherein the scheduling information is configured to indicate the terminal device to retransmit the uplink data, and the terminal device retransmits the uplink data based on the scheduling information.

In a second aspect, a wireless communication method is provided. The method includes: a network device monitors a preamble and uplink data sent by a terminal device, the network device sends scheduling information to the terminal device when the network device detects the preamble but does not detect the uplink data or the uplink data fails to be detected by the network device, wherein the scheduling information is configured to indicate the terminal device to retransmit the uplink data.

In a third aspect, a terminal device is provided. The terminal device is configured to perform the method in the above first aspect or any optional implementation of the first aspect. Specifically, the terminal device includes function modules configured to perform the method in the above first aspect or any optional implementation of the first aspect.

In a fourth aspect, a network device is provided. The network device is configured to perform the method in the above second aspect or any optional implementation of the second aspect. Specifically, the network device includes function modules configured to perform the method in the above second aspect or any optional implementation of the second aspect.

In a sixth aspect, a terminal device is provided. The terminal device includes a processor and a memory. The memory is configured to store a computer program, and the processor is configured to call and run the computer program stored in the memory to perform the method in the above first aspect or various implementations of the first aspect.

In a sixth aspect, a network device is provided. The network device includes a processor and a memory. The memory is configured to store a computer program, and the processor is configured to call and run the computer program stored in the memory to perform the method in the above second aspect or various implementations of the second aspect.

In a seventh aspect, a chip is provided. The chip is configured to perform the method in the above first aspect or any possible implementation of the first aspect. Specifically, the chip includes a processor configured to call and run a computer program from a memory to enable a device mounted with the chip to perform the method in the above first aspect or any possible implementation of the first aspect.

In an eighth aspect, a chip is provided. The chip is configured to perform the method in the above second aspect or any possible implementation of the second aspect. Specifically, the chip includes a processor configured to call and run a computer program from a memory to enable a device mounted with the chip to perform the method in the above second aspect or any possible implementation of the second aspect.

In a ninth aspect, a computer-readable storage medium is provided. The computer-readable storage medium is configured to store a computer program. The computer program enables a computer to perform the method in the above first aspect or any possible implementation of the first aspect.

In a tenth aspect, a computer-readable storage medium is provided. The computer-readable storage medium is configured to store a computer program. The computer program enables a computer to perform the method in the above second aspect or any possible implementation of the second aspect.

In an eleventh aspect, a computer program product is provided. The computer program product includes computer program instructions that enable a computer to perform the method in the above first aspect or any possible implementation of the first aspect.

In a twelfth aspect, a computer program product is provided. The computer program product includes computer program instructions that enable a computer to perform the method in the above second aspect or any possible implementation of the second aspect.

In a thirteenth aspect, a computer program is provided. When run on a computer, the computer program enables the computer perform the method in the above first aspect or any possible implementation of the first aspect.

In a fourteenth aspect, a computer program is provided. When run on a computer, the computer program enables the computer perform the method in the above second aspect or any possible implementation of the second aspect.

DETAILED DESCRIPTION

Technical solutions in implementations of the present disclosure are described below with reference to accompanying drawings.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD), an Advanced Long Term Evolution (LTE-A) system, a New Radio (NR) system, an evolution system of NR system, a LTE-based access to unlicensed spectrum (LTE-U) system, an NR-based access to unlicensed spectrum (NR-U) system, a Universal Mobile Telecommunication System (UMTS), a Worldwide Interoperability for Microwave Access (WiMAX) communication system, a Wireless Local Area Network (WLAN), Wireless Fidelity (WiFi), a next generation communication system or other communication systems.

An applied spectrum is not limited in the implementations of the present application. For example, the implementations of the present disclosure may be applied to a licensed spectrum, or an unlicensed spectrum.

Figure 1:
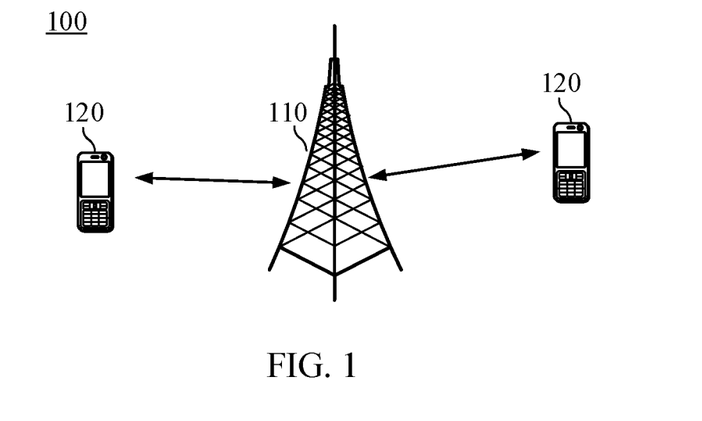
FIG. 1 is a schematic diagram of a wireless communication system to which an implementation of the present disclosure is applied.

FIG. 1 shows a wireless communication system 100 to which an implementation of the present disclosure is applied. The wireless communication system 100 may include a network device 110. The network device 110 may be a device that communicates with a terminal device. The network device 110 may provide communication coverage for a specific geographical area, and may communicate with a terminal device (e.g., UE) in the coverage area. Optionally, the network device 110 may be a Base Transceiver Station (BTS) in a GSM system or CDMA system, a NodeB (NB) in a WCDMA system, an Evolutional Node B (eNB or eNodeB) in an LTE system or an NR system, or a radio controller in a Cloud Radio Access Network (CRAN). Or the network device may be a relay station, an access point, a vehicle-mounted device, or a wearable device, a network device in a 5G network, or a network device in a future evolved Public Land Mobile Network (PLMN), etc.

The wireless communication system 100 further includes at least one terminal device 120 in the coverage area of the network device 110. The terminal device 120 may be mobile or fixed. Optionally, the terminal device 120 may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device or a computing device with a wireless communication function, or other processing device connected to a wireless modem, a vehicle-mounted device, a wearable device, a terminal device in a future 5G network, or a terminal device in a future evolved Public Land Mobile Network (PLMN), or the like. Optionally, a Device to Device (D2D) communication may be performed between the terminal devices 120.

Optionally, the 5G system or network may also be referred to as a New Radio (NR) system or network.

FIG. 1 shows one network device and two terminal devices as an example. Optionally, the wireless communication system 100 may include multiple network devices, and other quantity of terminal devices may be included within a coverage area of each network device, which are not limited in the implementations of the present application.

Optionally, the wireless communication system 100 may further include other network entities, such as an Access and Mobility Management Function (AMF), a Session Management Function (SMF), a Unified Data Management (UDM), or an Authentication Server Function (AUSF), which are not limited in the implementations of the present application.

In addition, various aspects or features of the present disclosure may be implemented as methods, apparatuses, or articles of manufacture using standard programming and/or engineering techniques. The term "article of manufacture" used in the present disclosure encompasses a computer program accessible from any computer-readable device, carrier, or medium. For example, the computer-readable medium may include, but not limited to, a magnetic storage device (such as a hard disk, a floppy disk, or a magnetic tape), an optical disk (such as a compact disc (CD), a digital versatile disc (DVD)), a smart card and a flash storage device (such as an Erasable Programmable Read-Only Storage (EPROM), card, stick or key drive). In addition, the various storage media described in the document may represent one or more devices and/or other machine-readable media for storing information. The term "machine-readable media" may include, but are not limited to, various media capable of storing, containing, and/or carrying instructions and/or data.

It should be understood that the terms "system" and "network" are often used interchangeably in the document. The term "and/or" in the document is merely an association relationship describing associated objects, indicating that there may be three relationships, for example, A and/or B may indicate three cases: A alone, A and B, and B alone. In addition, the symbol "/" in the document generally indicates that objects before and after the symbol "/" have an "or" relationship.

Before a terminal device can perform uplink transmission, the terminal device usually achieves synchronization with a network device through a random access procedure. At present, the random access procedure usually adopts a contention based four-step random access procedure. The four-step random access procedure will be described below with reference to FIG. 2.

It should be noted that implementations of the present disclosure are described by only taking the contention based random access as an example, but the present disclosure is not limited thereto, and the implementations of the present disclosure may also be applied to a contention free random access.

Figure 2:
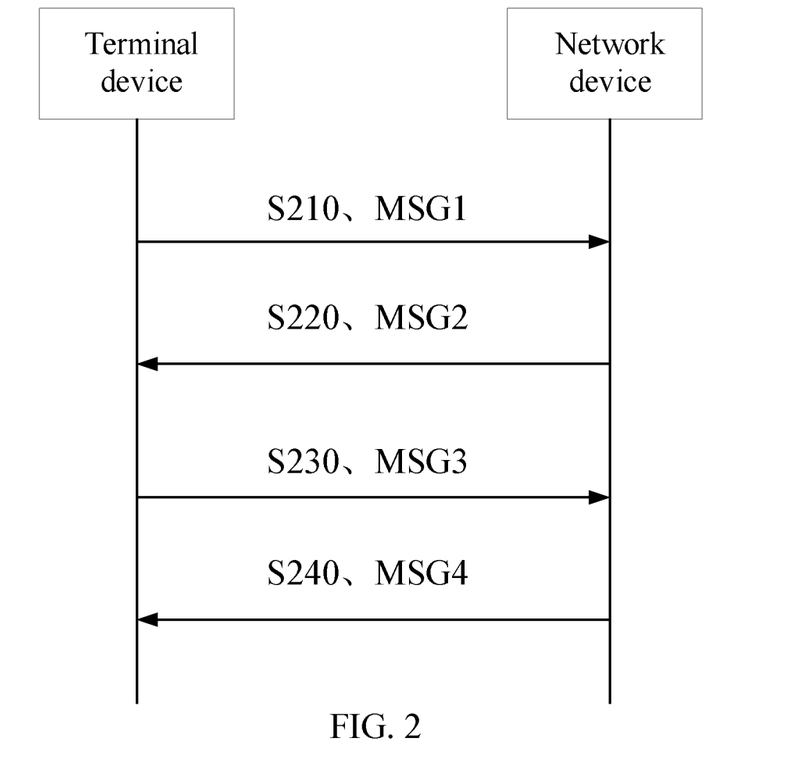
FIG. 2 is a schematic diagram of a four-step random access procedure according to an implementation of the present application.

In step S210, a terminal device sends a message 1 (MSG1) on a random access channel, and the MSG1 includes a random access preamble.

In step 220, after receiving the MSG1, a network device sends a MSG2 on a downlink share channel (DL-SCH), wherein the MSG2 is a Random Access Response (RAR).

The RAR response carries a timing advance (TA) adjustment of uplink transmission, information about available uplink resources and a temporary cell radio network temporary identifier (T-CRNTI), i.e., a temporary CRNTI.

Optionally, the RAR response may be generated by a Media Access Control (MAC) layer of the network device. One MSG2 may correspond to responses to random access requests of multiple terminal devices at the same time.

In step 230, after receiving the MSG2, the terminal device determines whether the MSG2 is an RAR message belonging to the terminal device itself, and if the terminal device determines that the MSG2 is an RAR message belonging to the terminal device itself, the terminal device sends a message 3 (MSG3) on an uplink resource designated by the MSG2, and the MSG3 carries a specific RNTI for the terminal device.

In step 240, after receiving the MSG3, the network device may send a MSG4 message to the terminal device. The MSG4 includes a contention resolution message and an uplink transmission resource allocated by the network device for the terminal device.

After receiving the MSG4, the terminal device may check whether the specific RNTI for the terminal device sent in the MSG3 is included in the contention resolution message sent by the network device. If the specific RNTI for the terminal device is included, it indicates that the random access procedure of the terminal device is successful; otherwise, it is considered that the random access procedure fails. After the random access procedure fails, the terminal device needs to initiate a random access procedure from the first step again.

However, the traditional four-step random access procedure needs four signaling interactions between the terminal device and the network device before the terminal device can successfully access. The four-step random access procedure easily causes a problem of high signaling overhead and a long access delay.

Therefore, to save the signaling overhead and reduce the access delay, a two-step random access procedure is proposed. In the two-step random access procedure, simply speaking, the first and third steps of the four-step random access procedure can be regarded as being combined into a first step of the two-step random access procedure, and the second and fourth steps of the four-step random access procedure can be regarded as being combined into a second step of the two-step random access procedure.

Figure 3:
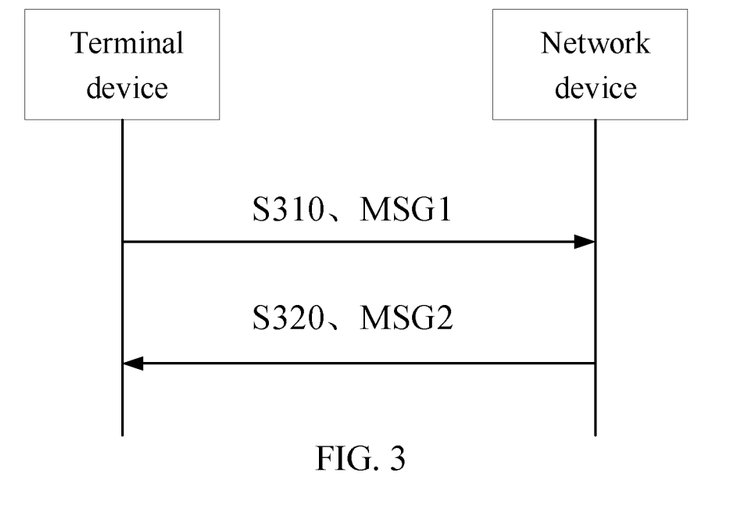
FIG. 3 is a schematic diagram of a two-step random access procedure according to an implementation of the present application.

The two-step random access procedure will be described below with reference to FIG. 3.

In step S310, a terminal device sends a MSG1 to a network device. The MSG1 includes a random access preamble and uplink data.

Optionally, the uplink data may be carried on a Physical Uplink Shared Channel (PUSCH). The PUSCH may carry a specific RNTI for the terminal device.

Optionally, content of the uplink data may be different according to different random access scenarios. For example, with regard to a random access initiated for an initial access, the uplink data may include a radio resource control (RRC) connection request message. For another example, with regard to a random access initiated for an RRC connection reestablishment, the uplink data may include an RRC connection reestablishment request message.

Optionally, the uplink data may be uplink information carried on a physical uplink control channel (PUCCH).

Optionally, the preamble may be a preamble randomly selected by the terminal device. For example, the preamble may be one of multiple preambles provided by the network device.

In step S320, the network device sends a random access response MSG2 to the terminal device.

However, in the two-step random access procedure, when the preamble and uplink data are sent together, there may be a situation that the network device only receives the preamble but does not receive the uplink data, in this situation, how to complete the random access procedure is an urgent problem to be solved.

An implementation of the present disclosure provides a wireless transmission method, which avoids a case in which the terminal device needs to reinitiate a random access request, i.e., resend the preamble and uplink data, under a situation that the network device only receives the preamble but does not receive the PUSCH. The wireless transmission method can reduce a delay of the random access procedure of the terminal device, and is beneficial for the terminal device to complete the random access procedure.

Figure 4:
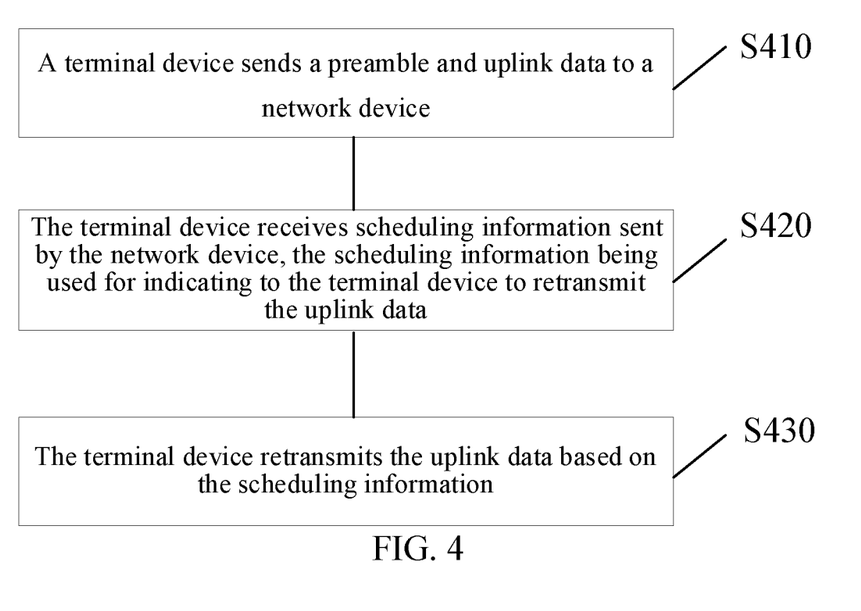
FIG. 4 is a schematic flow chart of a wireless communication method according to an implementation of the present application.

With reference to FIG. 4, a wireless communication method according to an implementation of the present disclosure will be described in detail below. The method in the FIG. 4 includes at least part of the following contents.

In act 410, a terminal device sends a preamble and uplink data to a network device.

Optionally, the uplink data may be carried on a PUSCH.

Optionally, the uplink data may be uplink information carried on a PUCCH.

Optionally, content of the uplink data may be different according to different random access scenarios. For example, with regard to a random access initiated for an initial access, the uplink data may include an RRC connection request message. For another example, with regard to a random access initiated for an RRC connection reestablishment, the uplink data may include an RRC connection reestablishment request message.

Optionally, the preamble may be one of multiple preambles provided by the network device. The terminal device may randomly select one preamble from the multiple preambles provided by the network device to send.

Optionally, the preamble may be specially allocated by the network device for the terminal device, that is, the preamble is bound with the terminal device. After receiving the preamble, the network device can uniquely identify the terminal device corresponding to the preamble.

The terminal device needs to select a resource for sending the preamble and uplink data. The network device may designate multiple resources available for transmission in advance, and the terminal device may randomly select one resource from the multiple resources to transmit the preamble and uplink data.

In act 420, the terminal device receives scheduling information sent by the network device, wherein the scheduling information is configured to indicate the terminal device to retransmit the uplink data.

Optionally, the terminal device receives the scheduling information sent by the network device in a certain time window after sending the preamble and uplink data.

The time window may be a preset time period after the uplink data is sent from the terminal device.

In act 430, the terminal device retransmits the uplink data based on the scheduling information.

According to the technical solution provided by the implementation of the present application, in the two-step random access procedure, when the network device only receives the preamble but does not receive the uplink data sent by the terminal device, the network device sends scheduling information indicating retransmission of the uplink data to the terminal device. Thus, the terminal device only needs to retransmit the uplink data, and does not need to reinitiate the random access procedure, that is, resend the preamble and uplink data, which can reduce a delay of the random access procedure of the terminal device, and is beneficial for the terminal device to complete the random access procedure.

In addition, when the network device only receives the preamble but does not receive the uplink data sent by the terminal device, the network device may send a response signal according to the four-step access procedure, resulting in an increased access delay. According to the solution provided by the implementation of the present application, fallback to the four-step random access procedure can be avoided, and the access delay can be reduced.

Optionally, the scheduling information may carry an indicator which may indicate to the terminal device to retransmit the uplink data.

Of course, when the network device correctly receives the preamble and uplink data, the indicator carried in the scheduling information may indicate to the terminal device to receive a physical downlink shared channel (PDSCH).

Specifically, after receiving the scheduling information, the terminal device may determine whether to retransmit the uplink data or receive the PDSCH sent by the network device according to the information indicated by the indicator.

When the indicator indicates to the terminal device to retransmit the uplink data, the terminal device retransmits the uplink data based on the scheduling information. When the indicator indicates to the terminal device to receive a PDSCH, the terminal device receives the PDSCH based on the scheduling information.

Optionally, the indicator may be represented by a bit. For example, the indicator may be represented by one bit. When the bit is 0, it indicates that the terminal device needs to retransmit the uplink data. When the bit is 1, it indicates that the terminal device needs to receive the PDSCH sent by the network device.

The implementation of the present disclosure only takes the bit as an example for description, and representations of the indicator may be in other forms, which are not limited by the implementation of the present application.

Optionally, the scheduling information includes an uplink transmission parameter, and the uplink transmission parameter is a parameter for the terminal device to retransmit the uplink data.

After receiving the scheduling information indicating retransmission, the terminal device retransmits the uplink data with a corresponding uplink transmission parameter according to the scheduling information.

Optionally, the uplink transmission parameter includes at least one of the following parameters: a time domain resource, a frequency domain resource, a pilot frequency resource, and a modulation and coding scheme (MCS).

The time domain resource may be a radio frame, a subframe, a time slot, or a symbol, etc. For example, the time domain resource may include a starting symbol and a number of symbols in a time slot.

The frequency domain resource may be a bandwidth, a subcarrier, etc.

The pilot frequency resource may be a cyclic shift value, a sequence initialization value and orthogonal codes of a reference sequence.

The terminal device may determine a transmission rate used for transmitting the uplink data through a value of the MCS.

Optionally, the scheduling information may include multiple sets of uplink transmission parameters, and the terminal device may select a set of uplink transmission resources from the multiple sets of uplink transmission parameters based on the scheduling information, and retransmit the uplink data based on the selected uplink transmission parameters.

For example, when multiple terminal devices select the same preamble and transmit on the same resource, to reduce a probability of collisions, multiple sets of available uplink transmission parameters may be carried in the scheduling information sent by the network device. Thus, after receiving the scheduling information, the terminal device may randomly select one set of uplink transmission parameters from the multiple sets of uplink transmission parameters as the parameters for retransmitting the uplink data. Compared with a scheme in which the scheduling information only carries one set of uplink transmission parameters, a probability that the terminal devices use the same set of uplink transmission parameters to retransmit the uplink data can be reduced to some extent, which is beneficial to resolution of collisions.

It can be understood that each set of uplink transmission parameters in the multiple sets of uplink transmission parameters may include at least one of the following parameters: a time domain resource, a frequency domain resource, a pilot frequency resource, and a modulation and coding scheme (MCS).

Optionally, the terminal device uses a hybrid automatic repeat request (HARQ) process determined before an initial transmission of the uplink data to transmit the uplink data. After that, the terminal device may use the determined HARQ process when transmitting the uplink data initially and/or retransmitting the uplink data. The initially transmitted uplink data may be uplink data sent by the terminal device when the terminal device initiates a random access request.

The determined HARQ process may be, for example, preset on the terminal device, or the terminal device may obtain the determined HARQ process by reading a system broadcast message.

It should be noted that, in the implementation of the present application, a way for the terminal device to obtain the HARQ process may not be limited to a scenario of retransmitting the uplink data. For example, the way for the terminal device to obtain the HARQ process may also be applied to a scenario in which the network device correctly receives the preamble and uplink data.

The determined process may be a process configured by the network device to the terminal device in advance, or a process preset in a protocol.

When the determined HARQ process is used for transmitting the uplink data, the scheduling information sent by the network device may not carry the HARQ process for retransmitting the uplink data.

Optionally, the scheduling information may also include TA information, and the TA is used for uplink transmission after the terminal device receives the scheduling information.

For example, the TA may be used for retransmission of the uplink data by the terminal device, or may be used for transmission of uplink data by the terminal device after the random access is successful.

The TA information may indicate a timing advance used when the terminal device retransmits the uplink data.

Optionally, the scheduling information may further carry indication information which may indicate that the scheduling information is scheduling information for the terminal device. Specifically, the scheduling information is scheduling information specially belonging to the terminal device.

The indication information may be represented by at least one piece of the following information: specific RNTI information for the terminal device, ID information of the preamble, and ID information of the terminal device.

Specifically, when the scheduling information received by the terminal device includes the specific RNTI information for the terminal device, the ID information of the preamble sent by the terminal device, and/or the ID information of the terminal device, the terminal device may determine that the scheduling information is scheduling information specially belonging to the terminal device itself.

Optionally, the indication information may be represented by bits.

When the scheduling information includes the specific RNTI for the terminal device, the specific RNTI for the terminal device may be represented by bits with a certain length in the scheduling information. After receiving the scheduling information, if determining that the bits in the scheduling information represent the specific RNTI for the terminal device itself, the terminal device may determine that the scheduling information is scheduling information specially belonging to the terminal device itself.

Alternatively, the scheduling information may be scrambled with the specific RNTI for the terminal device. When the scheduling information is scrambled with the specific RNTI for the terminal device, if the terminal device can correctly decode the scheduling information, it indicates that the scheduling information is scheduling information specially belonging to the terminal device.

Optionally, the scheduling information including the specific RNTI for the terminal device may refer to a parity bit in the scheduling information being scrambled with the specific RNTI for the terminal device.

Optionally, when the scheduling information received by the terminal device includes the above indication information, the terminal device may determine that random access contention is successful. That is, after the terminal device receives the scheduling information, if the scheduling information includes the ID of the preamble sent by the terminal device, the specific RNTI for the terminal device, and/or the ID of the terminal device, the terminal device may determine that the random access contention is successful.

The implementations of the present disclosure do not specifically limit the way in which the network device obtains the indication information. For example, the preamble may be bound with the terminal device, and one preamble corresponds to one terminal device. After receiving the preamble sent by the terminal device, the network device may retrieve the ID information of the terminal device and/or the specific RNTI information for the terminal device according to a corresponding relationship between preambles and terminal devices. For another example, when a connection between the terminal device and the network device needs to be reestablished after the terminal device and the network device are disconnected from a connected state, the network device may obtain the ID information of the terminal device and/or specific RNTI information for the terminal device according to previous record information.

Optionally, the network device may obtain the ID information of the preamble after receiving the preamble sent by the terminal device.

Figure 5:
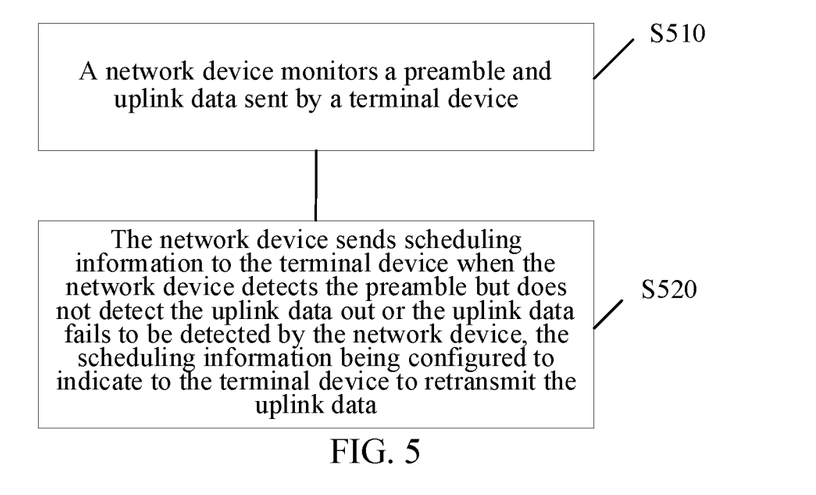
FIG. 5 is a schematic flow chart of another wireless communication method according to an implementation of the present application.

FIG. 5 is a schematic flow chart of another wireless communication method according to an implementation of the present application. The method in the FIG. 5 includes at least part of the following contents.

In act 510, a network device monitors a preamble and uplink data sent by a terminal device.

Optionally, the uplink data may be carried on a PUSCH.

Optionally, the uplink data may be uplink information carried on a PUCCH.

In act 520, the network device sends scheduling information to the terminal device when the network device detects the preamble but does not detect the uplink data or the uplink data fails to be detected by the network device, wherein the scheduling information is configured to indicate the terminal device to retransmit the uplink data.

Optionally, the network device may know in advance whether the terminal device uses a four-step random access procedure or a two-step random access procedure.

For example, the network device may determine whether the terminal device selects the four-step random access or the two-step random access according to a preamble sequence sent by the terminal device. Assuming that a preamble sequence set of the four-step random access is set 1 and a preamble sequence set of the two-step random access is set 2, the network device and the terminal device may obtain preamble sequences in the set 1 and set 2, respectively.

Before sending the preamble, the terminal device may select the preamble from different sets to send according to its own needs. When the terminal device determines that it needs to use the four-step random access, the terminal device may randomly select a preamble from the set 1 to send. When the terminal device determines that it needs to use the two-step random access, the terminal device may randomly select a preamble from the set 2 to send.

After receiving the preamble sent by the terminal device, the network device may determine whether the terminal device uses the two-step random access or the four-step random access according to the set to which the preamble sequence belongs. When the received preamble sequence belongs to the set 1, the network device may determine that the terminal device adopts the four-step random access. When the received preamble belongs to the set 2, the network device may determine that the terminal device adopts the two-step random access.

When the network device determines that the terminal device uses the two-step random access procedure, the network device may monitor the preamble and uplink data sent by the terminal device on a corresponding resource.

When the network device detects the preamble, but does not detect the uplink data or the uplink data fails to be detected by the network device, the network device sends scheduling information indicating retransmission of the uplink data to the terminal device.

When the network device detects both the preamble and the uplink data sent by the terminal device, the network device may send scheduling information indicating to receive a PDSCH to the terminal device.

Optionally, the scheduling information may include an indicator which may indicate whether the terminal device retransmits the uplink data or receives the PDSCH.

Optionally, the indicator may be represented by a bit. For example, the indicator may be represented by one bit. When the bit is 0, it indicates that the terminal device needs to retransmit the uplink data. When the bit is 1, it indicates that the terminal device needs to receive the PDSCH sent by the network device.

The implementation of the present disclosure only takes the bit as an example for description, and representations of the indicator may be in other forms, which are not limited by the implementation of the present application.

Optionally, the scheduling information includes an uplink transmission parameter, and the uplink transmission parameter is a parameter for the terminal device to retransmit the uplink data.

Optionally, the uplink transmission parameter includes at least one of the following parameters: a time domain resource, a frequency domain resource, a pilot frequency resource, and an MCS.

The time domain resource may be a radio frame, a subframe, a time slot, or a symbol, etc. For example, the time domain resource may include a starting symbol and a number of symbols in a time slot.

The frequency domain resource may be a bandwidth, a subcarrier, etc.

The pilot frequency resource may be a cyclic shift value, a sequence initialization value and orthogonal codes of a reference sequence.

The terminal device may determine a transmission rate used for transmitting the uplink data through a value of the MCS.

Optionally, the scheduling information may include multiple sets of uplink transmission parameters, and the multiple sets of uplink transmission parameters may be used for the terminal device to select parameters for retransmitting the uplink data.

Specifically, when the network device receives random access requests sent by multiple terminal devices, and the random access requests use the same preamble and the same transmission resource is used for transmitting the preamble, multiple sets of uplink transmission parameters are carried in the scheduling information sent by the network device to the multiple terminal devices for the multiple terminal devices to select.

Thus, after receiving the scheduling information, the terminal device may randomly select one set of uplink transmission parameters from the multiple sets of uplink transmission parameters as parameters for retransmitting the uplink data. Compared with a scheme in which the scheduling information only carries one set of uplink transmission parameters, a probability that terminal devices use the same uplink transmission parameter to retransmit the uplink data can be reduced to some extent, which is beneficial to resolution of collisions.

If a HARQ process has been determined when the terminal device initially transmits the uplink data, the network device may not carry the HARQ process for retransmitting the uplink data when sending the scheduling information.

For example, the HARQ process determined by the terminal device may be predetermined in advance by the terminal device and the network device, or may be indicated to the terminal device by the network device through a system broadcast message.

Optionally, the scheduling information may also include TA information, and the TA is used for uplink transmission after the terminal device receives the scheduling information.

For example, the TA may be used for retransmission of the uplink data by the terminal device, or may be used for transmission of uplink data by the terminal device after the random access is successful.

Optionally, the scheduling information may further carry indication information which may indicate that the scheduling information is scheduling information for the terminal device. Specifically, the scheduling information is scheduling information specially belonging to the terminal device.

The indication information may be represented by at least one piece of the following information: specific RNTI information for the terminal device, ID information of the preamble, and ID information of the terminal device.

Specifically, when the scheduling information received by the terminal device includes the specific RNTI information for the terminal device, the ID information of the preamble sent by the terminal device, and/or the ID information of the terminal device, the terminal device may determine that the scheduling information is scheduling information specially belonging to the terminal device itself.

Optionally, the indication information may be represented by bits.

When the scheduling information includes the specific RNTI for the terminal device, the specific RNTI for the terminal device may be represented by bits with a certain length in the scheduling information, or the scheduling information may be scrambled with the specific RNTI for the terminal device.

The wireless communication method according to the implementations of the present disclosure have been described in detail above, and devices according to implementations of the present disclosure will be described below with reference to FIGS. 6 to 10. The technical features described in the method implementations are applicable to the following device implementations.

Figure 6:
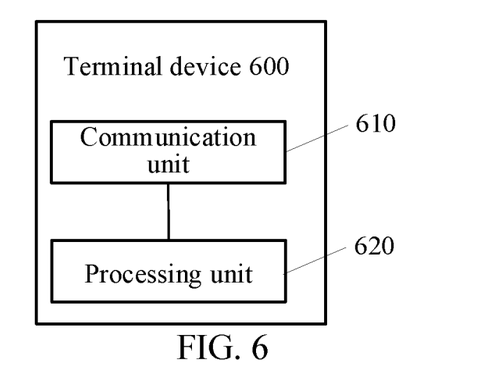
FIG. 6 is a schematic block diagram of a terminal device according to an implementation of the present application.

FIG. 6 is a schematic block diagram of a terminal device according to an implementation of the present application. The terminal device 600 of FIG. 6 includes a communication unit 610 and a processing unit 620.

The communication unit 610 is configured to send a preamble and uplink data to a network device.

The communication unit 610 is further configured to receive scheduling information sent by the network device, and the scheduling information is configured to indicate the terminal device to retransmit the uplink data.

The processing unit 620 is configured to retransmit the uplink data based on the scheduling information.

Optionally, the scheduling information includes an uplink transmission parameter, and the uplink transmission parameter is a parameter for the terminal device to retransmit the uplink data.

Optionally, the uplink transmission parameter includes at least one of the following parameters: a time domain resource, a frequency domain resource, a pilot frequency resource, and a modulation and coding scheme (MCS).

Optionally, the scheduling information includes multiple sets of uplink transmission parameters, and the processing unit 620 is specifically configured to select a set of uplink transmission parameters from the multiple sets of uplink transmission parameters based on the scheduling information, and retransmit the uplink data based on the selected set of uplink transmission parameters.

Optionally, the terminal device adopts a hybrid automatic repeat request (HARQ) process determined before an initial transmission of the uplink data to transmit the uplink data.

Optionally, the determined HARQ process is preset on the terminal device.

Optionally, the scheduling information does not include the HARQ process adopted by the terminal device to retransmit the uplink data.

Optionally, the scheduling information includes a timing advance (TA) of uplink transmission, and the TA is used for uplink transmission after the terminal device receives the scheduling information.

Optionally, the scheduling information carries indication information, and the indication information is configured to indicate that the scheduling information is scheduling information for the terminal device.

Optionally, the indication information includes at least one piece of the following information: an ID of the terminal device, a specific RNTI for the terminal device, and an ID of the preamble.

Figure 7:
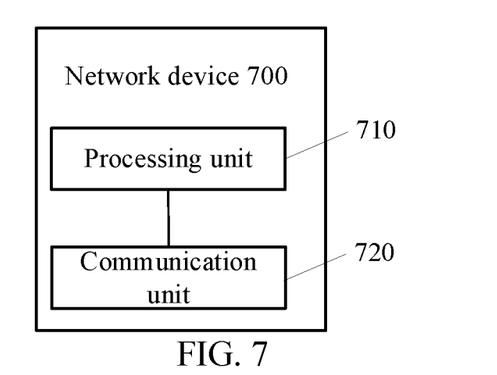
FIG. 7 is a schematic block diagram of a network device according to an implementation of the present application.

FIG. 7 is a schematic block diagram of a network device according to an implementation of the present application. The network device 700 shown in FIG. 7 includes a processing unit 710 and a communication unit 720.

The processing unit 710 is configured to monitor a preamble and uplink data sent by a terminal device.

The communication unit 720 is configured to send scheduling information to the terminal device when the network device detects the preamble but does not detect the uplink data or the uplink data fails to be detected by the network device, wherein the scheduling information is configured to indicate the terminal device to retransmit the uplink data.

Optionally, the scheduling information includes an uplink transmission parameter, and the uplink transmission parameter is a parameter for the terminal device to retransmit the uplink data.

Optionally, the uplink transmission parameter includes at least one of the following parameters: a time domain resource, a frequency domain resource, a pilot frequency resource, and a modulation and coding scheme (MCS).

Optionally, the scheduling information includes multiple sets of uplink transmission parameters, and the multiple sets of uplink transmission parameters are used for the terminal device to select parameters for retransmitting the uplink data.

Optionally, the scheduling information does not include the HARQ process adopted by the terminal device to retransmit the uplink data.

Optionally, the scheduling information includes a timing advance (TA) of uplink transmission, and the TA is used for uplink transmission after the terminal device receives the scheduling information.

Optionally, the scheduling information carries indication information, and the indication information is configured to indicate that the scheduling information is scheduling information for the terminal device.

Optionally, the indication information includes at least one piece of the following information: an ID of the terminal device, a specific RNTI for the terminal device, and an ID of the preamble.

Figure 8:
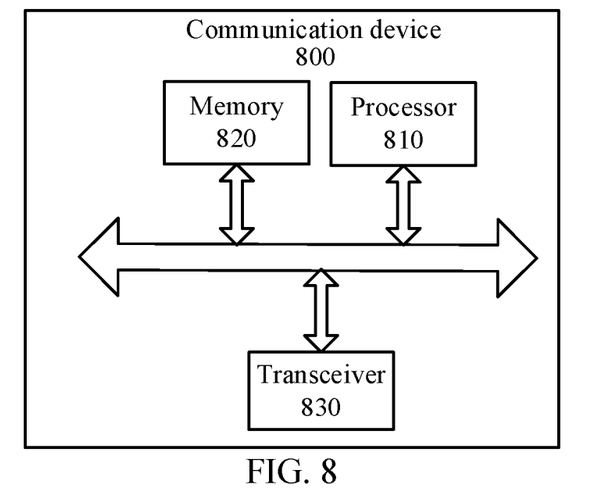
FIG. 8 is a schematic diagram of structure of a communication device according to an implementation of the present application.

FIG. 8 is a schematic diagram of structure of a communication device 800 according to an implementation of the present application. The communication device 800 shown in FIG. 8 includes a processor 810, which may call and run a computer program from a memory to implement the methods in the implementations of the present application.

Optionally, as shown in FIG. 8, the communication device 800 may further include a memory 820. The processor 810 may call and run a computer program from the memory 820 to implement the methods in the implementations of the present application.

The memory 820 may be a separate device independent of the processor 810 or may be integrated in the processor 810.

Optionally, as shown in FIG. 8, the communication device 800 may further include a transceiver 830, and the processor 810 may control the transceiver 830 to communicate with other devices. Specifically, the transceiver 830 may send information or data to other devices or receive information or data sent by other devices.

The transceiver 830 may include a transmitter and a receiver. The transceiver 830 may further include antennas, and a number of antennas may be one or more.

Optionally, the communication device 800 may be the network device of the implementations of the present application, and the communication device 800 may implement the corresponding processes implemented by the network device in various methods of the implementations of the present application, which will not be repeated herein for brevity.

Optionally, the communication device 800 may be specifically a mobile terminal/terminal device of the implementations of the present application, and the communication device 800 may implement the corresponding processes implemented by the mobile terminal/terminal device in the various methods of the implementations of the present application, which will not be repeated herein for brevity.

Figure 9:
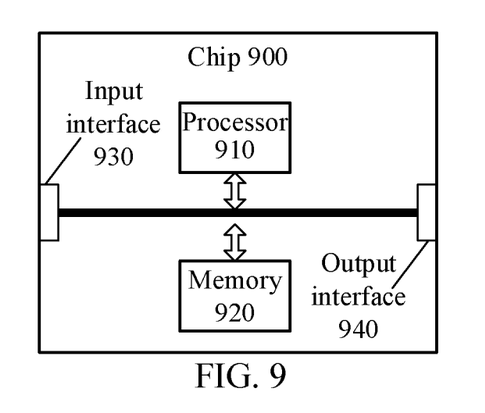
FIG. 9 is a schematic diagram of structure of a chip according to an implementation of the present application.

FIG. 9 is a schematic diagram of structure of a chip according to an implementation of the present application. A chip 900 shown in FIG. 9 includes a processor 910. The processor 910 may call and run a computer program from a memory to implement the methods in the implementations of the present application.

Optionally, as shown in FIG. 9, the chip 900 may further include a memory 920. The processor 910 may call and run a computer program from the memory 920 to implement the methods in the implementations of the present application.

The memory 920 may be a separate device independent of the processor 910 or may be integrated in the processor 910.

Optionally, the chip 900 may further include an input interface 930. The processor 910 may control the input interface 930 to communicate with other devices or chips. Specifically, the processor 910 may obtain information or data sent by other devices or chips.

Optionally, the chip 900 may further include an output interface 940. The processor 910 may control the output interface 940 to communicate with other devices or chips. Specifically, the processor 910 may output information or data to other devices or chips.

Optionally, the chip may be applied in the network device of the implementations of the present application, and the chip may implement the corresponding processes implemented by the network device in various methods of the implementations of the present application, which will not be repeated herein for brevity.

Optionally, the chip may be applied in a mobile terminal/terminal device of the implementations of the present application, and the chip may implement the corresponding processes implemented by the mobile terminal/terminal device in the various methods of the implementations of the present application, which will not be repeated herein for brevity.

It should be understood that the chip mentioned in the implementation of the present disclosure may be referred to as a system-level chip, a system chip, a chip system or a system-on-chip, etc.

Figure 10:
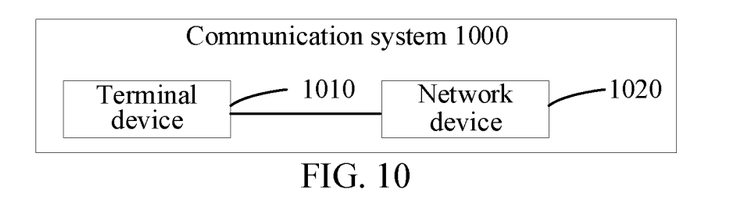
FIG. 10 is a schematic block diagram of a communication system according to an implementation of the present application.

FIG. 10 is a schematic block diagram of a communication system 1000 according to an implementation of the present application. As shown in FIG. 10, the communication system 1000 may include a terminal device 1010 and a network device 1020.

Herein, the terminal device 1010 may be configured to implement the corresponding functions implemented by the terminal device in the above-mentioned method, and the network device 1020 may be configured to implement the corresponding functions implemented by the network device in the above-mentioned method, which will not be repeated herein for brevity.

It should be understood that, the processor in the implementations of the present disclosure may be an integrated circuit chip having a signal processing capability. In an implementation process, the acts of the foregoing method implementations may be implemented by using an integrated logic circuit of hardware in the processor or instructions in a form of software. The processor may be a general purpose processor, a digital signal processor (DSP), an application specific integrated circuit (ASIC), a field programmable gate array (FPGA) or other programmable logic device, a discrete gate or a transistor logic device, or a discrete hardware component. The processor may implement or perform methods, acts and logical block diagrams disclosed in the implementations of the present application. The general purpose processor may be a microprocessor, or the processor may be any conventional processor or the like. The acts of the methods disclosed with reference to the implementations of the present disclosure may be directly implemented by a hardware decoding processor, or may be implemented by a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in the memory, and the processor reads the information in the memory and completes the acts of the above methods in combination with its hardware.

It may be understood that, the memory in the implementations of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through illustrative but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memories in the systems and methods described in the document are intended to include, but are not limited to, these and any memory of another proper type.

It should be understood that, the foregoing memory is an example for illustration and should not be construed as limiting. For example, optionally, the memory in the implementations of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus RAM (DR RAM), or the like. That is, the memories in the implementations of the present disclosure are intended to include, but are not limited to, these and any other suitable types of memories.

An implementation of the present disclosure further provides a computer-readable storage medium configured to store a computer program.

Optionally, the computer-readable storage medium may be applied in the network device of the implementations of the present application, and the computer program enables the computer to perform the corresponding processes implemented by the network device in various methods of the implementations of the present application, which will not be repeated herein for brevity.

Optionally, the computer-readable storage medium may be applied in a mobile terminal/terminal device of the implementations of the present application, and the computer program enables the computer to perform the corresponding processes implemented by the mobile terminal/terminal device in various methods of the implementations of the present application, which will not be repeated herein for brevity.

An implementation of the present disclosure also provides a computer program product including computer program instructions.

Optionally, the computer program product may be applied in the network device of the implementations of the present application, and the computer program instructions enable the computer to perform the corresponding processes implemented by the network device in various methods of the implementations of the present application, which will not be repeated herein for brevity.

Optionally, the computer program product may be applied in a mobile terminal/terminal device of the implementations of the present application, and the computer program instructions enable the computer to perform the corresponding processes implemented by the mobile terminal/terminal device in various methods of the implementations of the present application, which will not be repeated herein for brevity.

An implementation of the present disclosure also provides a computer program.

Optionally, the computer program may be applied in the network device of the implementations of the present application. When the computer program is run on the computer, the computer is enabled to perform the corresponding processes implemented by the network device in various methods of the implementations of the present application, which will not be repeated herein for brevity.

Optionally, the computer program may be applied in a mobile terminal/terminal device of the implementation of the present application. When the computer program is run on the computer, the computer is enabled to perform the corresponding processes implemented by the mobile terminal/terminal device in various methods of the implementations of the present application, which will not be repeated herein for brevity.

Those of ordinary skill in the art will recognize that the example elements and algorithm acts described in combination with the implementations disclosed herein may be implemented in electronic hardware, or a combination of computer software and electronic hardware. Whether these functions are implemented in hardware or software depends on a specific application and design constraints of the technical solution. A skilled person may use different methods to implement the described functions in respect to each particular application, but such implementation should not be considered to be beyond the scope of the present application.

Those skilled in the art may clearly understand that for convenience and conciseness of description, specific working processes of the systems, apparatuses and units described above may refer to the corresponding processes in the method implementations and will not be described herein.

In several implementations provided by the present application, it should be understood that the disclosed systems, apparatuses and methods may be implemented in other ways. For example, the apparatus implementations described above are only illustrative, for example, the division of the units is only a logical function division, and there may be other division modes in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present application, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the acts of the method described in various implementations of the present application. The foregoing storage medium includes: any medium that can store program code, such as a USB flash drive, a removable hard disk, a read-only memory (ROM), a random access memory (RAM), a magnetic disk, or an optical disc.

What are described above are merely illustrative implementations of the present application, but the protection scope of the present disclosure is not limited thereto. Any variation or substitution that may be easily conceived by a person skilled in the art within the technical scope disclosed by the present disclosure shall be included within the protection scope of the present application. Therefore, the protection scope of the present disclosure shall be determined by the protection scope of the claims.

What I claim is:

1. A wireless communication method, comprising:
   sending, by a terminal device, a preamble and uplink data, wherein the uplink data is carried on a physical uplink shared channel (PUSCH);
   receiving, by the terminal device, scheduling information sent by the network device, wherein the scheduling information is configured to indicate the terminal device to retransmit the uplink data; and
   retransmitting, by the terminal device, the uplink data based on the scheduling information;
   wherein the scheduling information comprises a plurality of sets of uplink transmission parameters and indication information, wherein the plurality of sets of uplink transmission parameters are configured for the terminal device to select parameters for retransmitting the uplink data, wherein each of the uplink transmission parameters comprises a time domain resource and a frequency domain resource, and the indication information comprises an ID of the preamble;
   wherein retransmitting, by the terminal device, the uplink data based on the scheduling information comprises that in response to receiving the ID of the preamble, the terminal device adopts a hybrid automatic repeat request (HARQ) process that is preset on the terminal device in a protocol before an initial transmission of the uplink data to retransmit the uplink data on the time domain resource and the frequency domain resource included in a selected one set of uplink transmission parameters.

2. The method according to claim 1, wherein the scheduling information further comprises at least one of the following parameters for the terminal device to retransmit the uplink data: a pilot frequency resource, and a modulation and coding scheme (MCS).

3. The method according to claim 2, wherein
   retransmitting, by the terminal device, the uplink data based on the scheduling information comprises:
   selecting, by the terminal device, a set of uplink transmission parameters from the plurality of sets of uplink transmission parameters based on the scheduling information; and
   retransmitting, by the terminal device, the uplink data based on the selected set of uplink transmission parameters.

4. The method according to claim 1, wherein the scheduling information further comprises a timing advance (TA) of uplink transmission, and the TA is used for uplink transmission after the terminal device receives the scheduling information.

5. The method according to claim 1, wherein the indication information further comprises at least one piece of the following information: an ID of the terminal device, and a specific radio network temporary identifier (RNTI) for the terminal device.

6. The method according to claim 1, wherein the uplink data comprises a Radio Resource Control (RRC) connection request message or an RRC connection reestablishment request message.

7. A terminal device, comprising a processor and a transceiver, wherein the processor is configured to control the transceiver to:
  send a first message to a network device, a preamble and uplink data, wherein the uplink data is carried on a physical uplink shared channel (PUSCH);
  receive scheduling information sent by the network device, and the scheduling information is configured to indicate the terminal device to retransmit the uplink data; wherein the scheduling information comprises a plurality of sets of uplink transmission parameters and indication information, wherein the plurality of sets of uplink transmission parameters are configured for the terminal device to select parameters for retransmitting the uplink data, wherein each of the uplink transmission parameters comprises a time domain resource and a frequency domain resource, and the indication information comprises an ID of the preamble; and
  in response to receiving the ID of the preamble, adopt a hybrid automatic repeat request (HARQ) process that is preset on the terminal device in a protocol before an initial transmission of the uplink data to retransmit the uplink data on the time domain resource and the frequency domain resource included in a selected one set of uplink transmission parameters.

8. The terminal device according to claim 7, wherein the scheduling information further comprises at least one of the following parameters for the terminal device to retransmit the uplink data: a pilot frequency resource, and a modulation and coding scheme (MCS).

9. The terminal device according to claim 8, wherein the processing unit is specifically configured to:
  select a set of uplink transmission parameters from the plurality of sets of uplink transmission parameters based on the scheduling information; and
  retransmit the uplink data based on the selected set of uplink transmission parameters.

10. The terminal device according to claim 7, wherein the scheduling information further comprises a timing advance (TA) of uplink transmission, and the TA is used for uplink transmission after the terminal device receives the scheduling information.

11. The terminal device according to claim 7, wherein the indication information further comprises at least one piece of the following information: an ID of the terminal device, and a specific radio network temporary identifier (RNTI) for the terminal device.

12. The method according to claim 7, wherein the uplink data comprises a Radio Resource Control (RRC) connection request message or an RRC connection reestablishment request message.

* * * * *